United States Patent
Nishinaka et al.

(10) Patent No.: US 7,247,367 B2
(45) Date of Patent: Jul. 24, 2007

(54) POLYIMIDE FILM AND PROCESS FOR PRODUCING THE SAME

(75) Inventors: Masaru Nishinaka, Otsu (JP); Takashi Itoh, Otsu (JP)

(73) Assignee: Kaneka Corporation, Osaka (JP)

( * ) Notice: Subject to any disclaimer, the term of this patent is extended or adjusted under 35 U.S.C. 154(b) by 150 days.

(21) Appl. No.: 10/467,210

(22) PCT Filed: Feb. 20, 2002

(86) PCT No.: PCT/JP02/01506

§ 371 (c)(1),
(2), (4) Date: Aug. 5, 2003

(87) PCT Pub. No.: WO02/066546

PCT Pub. Date: Aug. 29, 2002

(65) Prior Publication Data

US 2004/0063898 A1    Apr. 1, 2004

(30) Foreign Application Priority Data

Feb. 23, 2001   (JP) .................. 2001-047692

(51) Int. Cl.
  *B32B 27/32*    (2006.01)
  *B32B 27/00*    (2006.01)
  *C08G 69/26*    (2006.01)
(52) U.S. Cl. .................. 428/220; 428/473.5; 524/287; 524/218; 528/332
(58) Field of Classification Search ........... 428/220, 428/209, 336, 473.5, 901; 524/287, 218; 528/332
See application file for complete search history.

(56) References Cited

U.S. PATENT DOCUMENTS

| 4,603,061 | A | * | 7/1986 | St. Clair et al. ............. 427/162 |
| 4,908,430 | A |   | 3/1990 | Zecher et al. |
| 5,089,549 | A | * | 2/1992 | Kato ........................... 524/287 |
| 5,411,765 | A | * | 5/1995 | Kanakarajan et al. ..... 427/385.5 |
| 6,586,081 | B1 | * | 7/2003 | Nishinaka et al. .......... 428/209 |

FOREIGN PATENT DOCUMENTS

| EP | 1 004 925 | | 5/2000 |
| JP | 61-176629 | | 8/1986 |
| JP | 63-297428 | A | 12/1988 |
| JP | 06-200024 | A | 7/1994 |
| JP | 07-033875 | | 2/1995 |
| JP | 09-012719 | A | 1/1997 |
| JP | 09-048851 | | 2/1997 |
| JP | 2000-273172 | A | 10/2000 |
| JP | 2001-064387 | | 3/2001 |
| WO | 00/12604 | A1 | 3/2000 |

OTHER PUBLICATIONS

T. Matsuura et al. "Development and Application of Fluorinated Polyimide (FLUPI)", Function and Materials, vol. 12, No. 9, pp. 30-37, Sep. 1992.

Japanese language office action and its English translation for corresponding Japanese Patent Application No. 2002-566259 lists the references above.

* cited by examiner

*Primary Examiner*—Rena Dye
*Assistant Examiner*—Lawrence Ferguson
(74) *Attorney, Agent, or Firm*—Hogan & Hartson LLP

(57) ABSTRACT

The polyimide film of the present invention is produced in the following manner: polyamic acid made of a combination of a specific acid anhydride constituent and a specific diamine constituent are heated under a low-pressure circumstance for heat imidation, and the obtained imide is dissolved again in a solvent to be polyimide solution, then the polyimide solution is formed to be a film. In this manner, it is possible to provide a polyimide film essentially transparent and colorless, and has sufficient toughness to prevent occurrences of a crack or a break when the film is folded and creased by hand.

2 Claims, No Drawings

POLYIMIDE FILM AND PROCESS FOR PRODUCING THE SAME

TECHNICAL FIELDS

The present invention relates to a transparent and colorless polyimide film and the manufacturing method thereof, and in particular to a polyimide film, which is essentially transparent and colorless, and used for liquid crystal display material, optical communication material, waveguide material and solar battery protection film or the like, and the manufacturing method thereof. The manufacturing method of the polyimide film of the present invention may also be adopted for manufacturing a polyimide film having low dielectric constant.

Note that, "a film" in the present invention includes a film having self-supporting property i.e., some level of strength, and a thin layer or a coat formed on a surface or inside of a solid body.

BACKGROUND OF THE INVENTION

A polyimide film has been selected for various productive uses, which requires at least some extent of thermal stability, satisfactory electrical and mechanical characteristics. In addition to these characteristics, a polyimide film further having a desirable transparent characteristic has been created and widely adopted as an oriented film for liquid crystal display material, waveguide material and solar battery protection film. To be adopted for this purpose, the polyimide film has to have a desirable transparency. However, a polyimide film is often turned (changed to) yellow or brown due to thermal degradation resulting from severe thermal history in the depositing process. The coloring due to heat degradation damages a function of a display device, as it darkens the view, and therefore it had been considered unacceptable for the use of an oriented film of liquid crystal or the like.

In order to clear away this defect, various polyimide films have been created to realize a polyimide film causing low coloring and having high transparency. This prior art of polyimide films has been developed with a series of studies focusing on the change in color due to thermal degradation of a transparent polyimide film. More specifically, for example, Matuura et al. disclosed a structure effective for creating a polyimide film having superior transparency. The structure substitutes C—H bonding of a material monomer for C—F bonding, in other words, includes a fluorine substituent in the material monomer. However, it generally costs highly to use the material monomer including a fluorine substituent.

Further, in imidation by heating polyamic acid at high temperature (for example, at or higher than 400° C.) so as to express toughness of the film, or imidation by a chemical cure method which uses acid anhydride such as acetic anhydride, and tertiary amine such as picoline, it is experientially known that the obtained polyimide is colored due to thermal degradation or chemical reaction (the imidation causes bad effect for the color). However, when the polyamic acid is heated at relatively low temperature in order to prevent the foregoing problem, sufficient strength is not shown in the obtained film.

An object of the present invention is to provide a polyimide film essentially transparent and colorless, and has sufficient toughness to prevent occurrences of a crack or a break when the film is folded and creased by hand.

DISCLOSURE OF THE INVENTION

The present invention is made as a result of the intensive studies by the inventors in view of the foregoing conventional problems, and the studies have come to solve the foregoing problems by producing a film in the following manner: polyamic acid solution made of a combination of a specific acid anhydride constituent and a specific diamine constituent were heated under a low-pressure circumstance for imidation, and the obtained soluble polyimide resin is dissolved again in a solvent to be polyimide solution, then the polyimide solution is formed to be a film. In order to solve the foregoing problems, a polyimide film of the present invention, which uses a soluble polyimide resin obtained by diamine constituent and acid dianhydride constituent, is manufactured by the method including the steps of:

1) mixing and polymerizing the diamine constituent and the acid dianhydride constituent in a solvent so as to obtain a polyamic acid solution;

2) heating the polyamic acid solution under a low-pressure circumstance of not more than $0.9 \times 10^5$ Pa for imidation so as to obtain a polyimide resin;

3) dissolving the polyimide resin thus obtained in a solvent;

4) casting and applying a polyimide solution obtained through the step 3) to a supporting body so as to coat the supporting body with the polyimide solution; and 5) drying and solidifying the polyimide solution.

With the foregoing arrangement, it is possible to provide a polyimide film essentially transparent and colorless, and has sufficient toughness to prevent occurrences of a crack or a break when the film is folded and creased by hand.

In order to solve the foregoing problems, a method of manufacturing polyimide film which uses a soluble polyimide resin including diamine constituent and acid dianhydride constituent, including the steps of:

1) mixing and polymerizing the diamine constituent and the acid dianhydride constituent in a solvent so as to obtain a polyamic acid solution including polyamic acid polymers;

2) heating the polyamic acid solution under a low-pressure circumstance of not more than $0.9 \times 10^5$ Pa for imidation so as to obtain a polyimide resin;

3) dissolving the polyimide resin in a solvent so as to obtain a polyimide solution;

4) casting and applying the polyimide solution to a supporting body; and 5) drying and solidifying the polyimide solution.

With the foregoing arrangement, it is possible to provide a polyimide film essentially transparent and colorless, and has sufficient toughness to prevent occurrences of a crack or a break when the film is folded and creased by hand.

Additional objects, features, and strengths of the present invention will be made clear by the description below. Further, the advantages of the present invention will be evident from the following explanation in reference to the drawings.

BEST MODE FOR CARRYING OUT THE INVENTION

The following will explain an embodiment according to the present invention. Note that, the solvent used for mixing and polymerizing a diamine constituent and an acid dianhydride constituent in the present embodiment is hereinafter referred to as a polymerizing solvent.

A polyimide film according to the present invention is made in the following manner: polyamic acid solution, made by polymerizing a diamine constituent and acid dianhydride constituent in a polymerizing solvent, is heated under a low-pressure of not more than $0.9 \times 10^5$ Pa for imidation, and the obtained polyimide resin is melted again in a solvent, then the polyimide solution applied on a supporting body by casting, and is dried to be a solidified polyimide film.

Note that, to adopt the foregoing method, the polyimide resin must be soluble with respect to a solvent.

The acid dianhydride constituent according to the present invention has a structure including two dicarboxylic acid anhydrides in a single molecule, as denoted by the chemical formula (1) below.

To obtain a polyimide film with transparency and toughness, the present invention suitably uses the diamine constituent and the acid dianhydride constituent respectively denoted by the chemical formula (1) and the chemical formula (2). Further, it is more suitable to use the diamine denoted by the chemical formula (3) and the acid dianhydride denoted by the chemical formula (4). These monomer materials (the diamine constituent and the acid dianhydride constituent) may be used individually, or, it is also allowed to use a combination of two kinds or more of diamine, and/or a combination of two kinds or more of acid dianhydride. It is also allowed to use a combination of the other kinds of diamine constituent and other kinds of acid dianhydride constituent within a range of solubility for carrying out the present embodiment. Note that, this allowable range of solubility refers to solubility of not less that 1% of the polyimide resin with respect to the polymerizing solvent used for polymerizing the polyamic acid to obtain the polyimide resin, or with respect to other solvents.

$$H_2N-A-R-B-R-A-NH_2 \qquad (1)$$

A: A Single Bond or a Bivalent Hydrocarbon Group Having 1 to 3 Carbon Atoms

B:

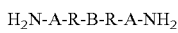

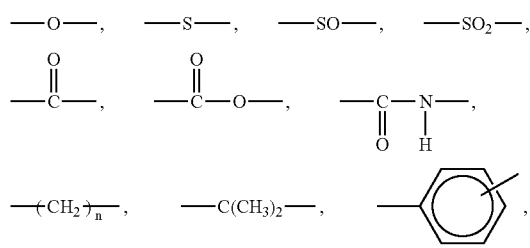

OR A SINGLE BOND

R: 

A SINGLE BOND OR A BIVALENT HYDROCARBON GROUP HAVING 1 TO 10 CARBON ATOMS

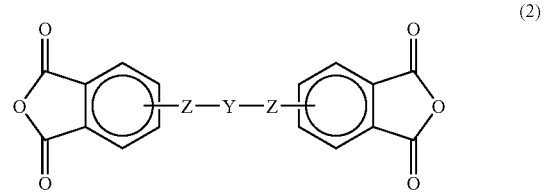

THE Zs ARE INDEPENDENT IN THE FORMULA

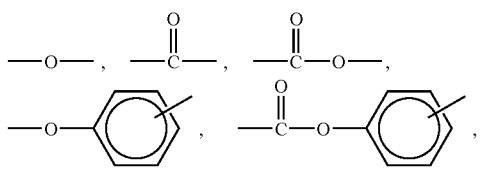

OR DENOTES A SINGLE BOND,
Y DENOTES, —O—, —S—, —SO—, —SO$_2$—, —(CH$_2$)—$_n$, —(CF$_2$)—$_n$, —C(CH$_3$)$_2$—, —C(CF$_3$)$_2$—, OR DENOTES A SINGLE BOND (n IS IN A RANGE FROM 1 TO 10)

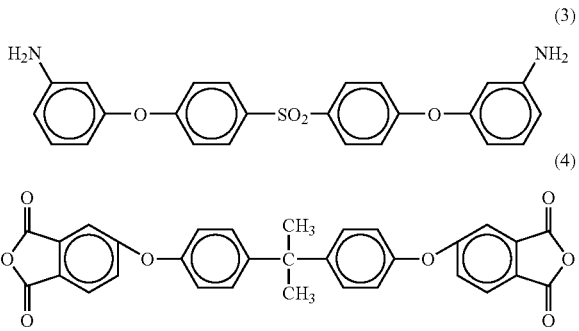

The other kinds of diamine constituent and acid dianhydride constituent may be all kinds of diamine constituent and acid dianhydride constituent which can be used for synthesis of insoluble polyimide resin. More specifically, the other kinds of diamine constituent can be a part of 3,3'-dimethoxybenzidine, 3,3'-dimethylbenzidine, 3,3'-dihydroxybenzidine or the like, or, aromatic diamine having a substituent, or other aliphatic diamine.

Further, the other kinds of acid dianhydride constituent can be aromatic tetra carboxylic acid dianhydride, or aliphatic acid dianhydride, such as pyromellitic acid dianhydride, 1,4,5,8-naphthalene tetra carboxylic acid dianhydride, 2,3,6,7-naphthalene tetra carboxylic acid dianhydride, 4,4'-oxydiphthalic acid anhydride, 3,3',4,4'-tetra phenylsilane tetra carboxylic acid dianhydride, 2,3,4,5-furan tetra carboxylic acid dianhydride, p-phenylenediphthalic acid dianhydride.

Further, some constituent other than those diamine constituent and acid dianhydride constituent may be added at an arbitrary step of manufacturing the polyimide film. More specifically, for example, the additives can be oxidation inhibitor, light stabilizer, fire retardant, antistatic additive, heat stabilizer, ultraviolet absorption agent, other organic additives, inorganic fillers, and metal fine powders. Further, a polyimide film compound may be created by adding various reinforcements.

The diamine constituent and the acid dianhydride constituent, which are substantially equimolar, are reacted by a publicly known method so as to raise polymerization degree. By thus raising the polymerization degree, polyamic acid solution of high molecule weight is created. The molar ratio of the acid dianhydride constituent and the diamine constituent is preferably in a range of from 0.9 to 1.1/1.0, and more preferably, from 0.98 to 1.02/1.0.

Also, it is preferable that the polymerizing solvent used for the polymerization is inactive with respect to polymerization reaction, and does not decompose during the imidation by heating (heat imidation).

The followings are specific examples of the polymerizing solvent: sulfoxide type solvent such as dimethyl sulfoxide, diethyl sulfoxide; formamide type solvent such as N,N-dimethyl formamide, N,N diethyl formamide; acetamide type solvent such as N,N-dimethyl acetamide, N,N-diethyl acetamide; pyrrolidone type solvent such as N-methyl-2-pyrrolidone, N-vinyl 2-pyrrolidone; phenol type solvent such as phenol, o-, m-, p-cresol, xylenol, halide phenol, catechol; hexa methyl phosphol amide or γ-butyrolactone. These polymerizing solvents may be used individually or by mixing two or more kinds. Further, it is also acceptable that those solvents partly includes aromatic carbon hydrate such as xylene or toluen. Note that, "solution" in the following explanation includes "dispersion liquid".

A publicly known method may be used to dissolve, mix and polymerize those monomer materials in the polymerizing solvent so as to obtain polyamic acid solution including polyamic acid polymers. The followings are specific examples of the method in the case of using tetra carboxylic acid dianhydride constituent as the acid dianhydride constituent: a method which dissolves the diamine constituent in a polymerizing solvent, then gradually adds the tetra carboxylic acid dianhydride constituent therein; a method which simultaneously dissolves both diamine constituent and the acid dianhydride constituent in a solvent; and a method which alternately dissolves the diamine constituent and the acid dianhydride constituent in a solvent.

When polyamic acid polymers included in polyamic acid solution are obtained through copolymerization by using three or more kinds of monomer material, molecule configuration in the polyamic acid polymer (high molecule) may be controlled by changing the order for adding the monomers in the polymerizing solvent. The copolymerization may be carried out through some suggested methods such as random copolymerization, block copolymerization, partial block copolymerization, or sequential copolymerization.

To easily handle the polyamic acid solution, the concentration of solid content in the solution, i.e., the concentration of the polyamic acid polymer included in the polyamic acid solution is preferably within a range from 5 to 30% by weight, further preferably within a range from 10 to 25% by weight, and most preferably within a range from 15 to 20% by weight. Further, the viscosity of the polyamic acid solution is preferably within a range from 10 to 1000 Pa·s, and further preferably within a range from 100 to 500 Pa·s.

Further, in the polymerization of the polyamic acid polymers, a filtration process or the like may be performed for removing extraneous substances or high-molecular-weight substance, which are included in the polyamic acid solution. This process may be carried out at an arbitrary stage of the polymerization, for example, before the polymerization, during the polymerization, or after the polymerization.

Further, so as to reduce the time for the polymerization, the polyamic acid polymers may be obtained by carrying out two polymerization steps as follows: a first step for creating a so-called pre-polymer (low-molecular-weight substance), and a second step for creating a high-molecular-weight polymer by increasing the molecule weight of the pre-polymer.

Especially, this two steps polymerization method is more preferable in terms of polymerization efficiency or filtration efficiency since the filtration process or the like may be performed at the stage of the low-molecular-weight substance, which is obtained after the first polymerizing step. Then, after the filtration, the second polymerization step is carried out.

Further, the polyamic acid solution of the present invention may include various additives as required in addition to the polyamic acid polymers and the polymerizing solvent. In other words, the manufacturing method of the present invention may include a step for adding the various additives as required. The various additives are not specially limited; however, the specific examples can be oxidation inhibiter, light stabilizer, fire retardant, antistatic additive, heat stabilizer, ultraviolet absorption agent, inorganic fillers, metal fine powders, and various reinforcements. The additives may be used individually or by mixing two or more kinds.

To perform imidation on the polyamic acid polymers so as to obtain a polyimide resin, a common method may be used such as a heat method which dehydrates the polyamic acid solution by heating, or a chemical method which dehydrates the polyamic acid solution by using dehydrating agent. However, the normal heat method (heat curing) decreases the toughness of the polyimide film, since water is generated during the process of imidation, and causes hydrolysis of the polyamic acid polymer, which decreases the molecule weight of the polyimide resin. Further, the chemical method, i.e., the chemical imidation method, improves the strength and the toughness of the film; however, it also causes coloring. In order to solve this problem, the present invention adopts a method which performs imidation by heating the polyamic acid solution under a low-pressure circumstance. With this method, it becomes possible to remove the water generated during the process of obtaining imide from the system, and to suppress the hydrolysis of the polyamic acid polymer, thereby increasing the molecule weight of the obtained polyimide resin. Also, carrying out this method closes the one-side or both-side open-rings of impurities existed in the acid dianhydride (one of the monomer materials). Thus, the molecule weight of the polyimide resin may further be increased.

Further, since the heating is performed under a low-pressure circumstance, the imidation can be carried out at a lower temperature than that when the imidation is carried out under a normal pressure circumstance, and also degradation due to oxidization is prevented. Accordingly, the imidation which performs heating under a low-pressure circumstance prevents occurrence of coloring of the polyimide film since adopting this method can suppress the heat degradation and the oxidization degradation.

Thus, with the imidation which performs heating under a low-pressure circumstance, the molecule weight increases, and the imidation can be carried out at a lower temperature than that when the imidation is carried out under a normal pressure circumstance, and also degradation due to oxidization is prevented, thereby creating a polyimide film having sufficient strength and superior transparency.

In the heating under a low-pressure circumstance, the heating temperature is preferably within a range of from 80 to 400° C. Further, the lowest heating temperature, i.e., the lower limit of the heating temperature is preferably at or higher than 100° C., which ensures efficiencies of the imidation and water draining, and further preferably at or higher than 120° C. Meanwhile, the highest heating temperature, i.e., the higher limit of the heating temperature is preferably at or lower than the temperature causing the heat decomposition of the creating polyimide. To satisfy these conditions, the imidation completion temperature, which is about from 150 to 350° C., is normally adopted.

In the imidation, it is preferable to set the pressure as low as possible. To be more specific, it is preferably not more than $0.9 \times 10^5$ Pa, more preferably not more than $0.5 \times 10^5$ Pa, and further preferably not more than $0.1 \times 10^5$ Pa. In the case where the pressure excesses $0.9 \times 10^5$ Pa, the imidation temperature has also to be raised. Performing the imidation at higher temperature is not desired since it may cause coloring of the created polyimide film due to heat degradation.

Though the solvent for dissolving the created polyimide resin is not specially limited as long as capable of dissolving polyimide resins, it is preferable to use a polymerizing solvent for polyamic acid polymers. Further, to efficiently dry the polyimide solution to complete a film, the boiling point of the solvent have to be not more than 160° C., preferably not more than 130° C., and further preferably not more than 105° C. The followings are specific examples of the solvent: tetrahydrofuran (hereinafter refereed to as THF, boiling point: 66° C.); 1,4-dioxane (hereinafter referred to as dioxane, boiling point: 103° C.); monoglyme (boiling point: 84° C.); dioxolane (boiling point: 76° C.). These solvents may be used individually or by mixing two or more kinds.

It is preferable that the concentration of solid content in the polyimide solution is preferably within a range from 10 to 50% by weight, and more preferably within a range from 20 to 30% by weight.

In the method for obtaining a polyimide film of the present invention by casting and applying the polyimide solution to a supporter and drying the solution to create a film, an arbitrary material may be used for the supporter, and arbitrary method may be adopted for casting and applying the polyimide solution to the supporter.

As to specific examples of the supporter, a flat plate such as a glass plate, a stainless plate, or a stainless drum, an endless belt or the like may be adopted. Also, a metal foil, or heat-resistant resin sheet or the like may be adopted.

The casting and applying of the polyimide solution to the supporter may be performed by a publicly known method, such as a comma coater, an applicator, a gravure coater, a die coater, or a knife coater or the like. Among these methods, the comma coater or the die coater is most preferred because of its operational properties and the film thickness control properties.

The polyimide solution applied on the supporter by casting may be dried and solidified by heating the polyimide solution to remove the solvent. The heating temperature for drying out the polyimide solution is not specially limited; however, it is preferably within a range of from 50 to 300° C. Further, it is preferable that the heating is carried out under an evacuated circumstance or an inert atmosphere circumstance, as it prevents the unwanted effect of oxygen.

Further, after the polyimide film is dried on the supporter by removing the solvent and cured to have sufficient self-supporting property, the polyimide film may be heated and dried again after being peeled off the supporter and fixed with pins or clips at its ends.

As thus described, by dissolving the polyimide resin in the solvent and then casting and applying the polyimide solution to the supporter, it is possible to prevent the unwanted coloring caused by heat, oxygen, or chemicals during the imidation of the polyamic acid. Further, dissolving the polyimide resin in the solvent again and casting and applying the solution to the supporter ensures a desirable flatness, and therefore the created polyimide film has even thickness. Consequently, the transparency of the polyimide film improves.

In addition, a polyimide coat may be created by applying and drying the polyimide resin solution made through the foregoing method.

The toughness of the created polyimide film may be tested depending whether or not a crack or a break occurs when the film is folded by hand. Further, quantitative toughness of the film may be tested by checking its strength with the method of JIS K-7128. A result of high level tearing strength according to this method ensures high level toughness of the film.

Note that, the manufacturing method of the polyimide film of the present invention may be effective for the manufacturing method of a polyimide film or a polyimide coat having low dielectric constant.

EMBODIMENTS

The following will specifically explain the present invention with embodiments. In the embodiments, DMF expresses N,N-dimethyl formamide.

Methods of manufacturing and testing a polyimide film (hereinafter referred to as a sample).

Manufacturing of a sample: 1 equivalent weight of diamine and 1 equivalent weight of acid dianhydride are polymerized by agitation in DMF to create polyamic acid solution having 30% by weight concentration of solid content. Secondly, the obtained polyamic acid solution is heated in an evacuated oven for three hours at 200° C. under pressure of not more than 100 Pa so as to create a dry polyimide resin. Next, the created polyimide resin is melted in DMF to have 20% by weight concentration of solid content. Then, the polyimide solution is applied on a glass plate by casting so that the thickness of the solution is 0.7 mm, and heated for 20 minutes at 80° C., and then, the dried film is peeled off the glass plate. Next, the four sides of the film are pinned, and heated 5 minutes at 150° C., and another 5 minutes at 200° C. so as to create a polyimide film of 75 µm thick. The created polyimide film is tested for its transparency, tearing strength, and toughness.

The following will explain the testing methods for those properties.

Measurement of transparency: the transparency of the film of 75 µm thick at a wavelength of 440 nm is measured by using a spectrophotometer (Ubest-30 type; JASCO corporation).

Measurement of tearing strength: the tearing strength of the film is measured according to JIS K 7128 ("A" method).

Measurement of toughness: the sample is folded and creased by hand. Then, each sample is determined acceptable if it causes no cracks or breaks, and is determined unacceptable if it causes cracks or breaks.

Embodiments 1 Through 4

The samples made of various monomers were tested for its transparency, tearing strength, and toughness in the following embodiments 1 through 4. The table 1 shows the result of the tests.

Embodiment 1

A sample was made of diamine constituent based on the chemical formula (3), and acid dianhydride based on the chemical formula (4). Table 1 shows the results of the tests with respect to this sample.

(3)

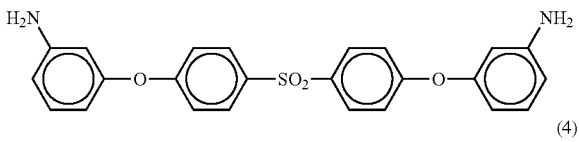

(4)

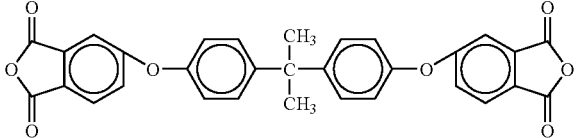

Embodiment 2

A sample was made of diamine constituent based on the chemical formula (5), and acid dianhydride based on the chemical formula (4). Table 1 the results of the tests with respect to this sample.

(5)

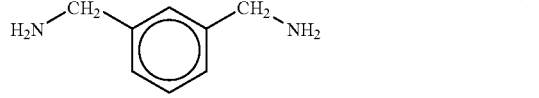

(4)

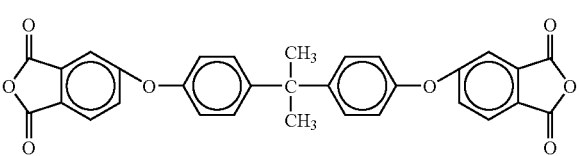

Embodiment 3

A sample was made of diamine constituent based on the chemical formula (3), and acid dianhydride based on the chemical formula (6). Table 1 shows the results of the tests with respect to this sample.

(3)

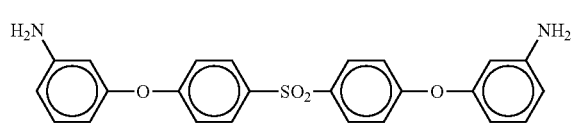

Embodiment 4

A sample was made of diamine constituent based on the chemical formula (3), and acid dianhydride based on the chemical formula (7). Table 1 shows the results of the tests with respect to this sample.

(3)

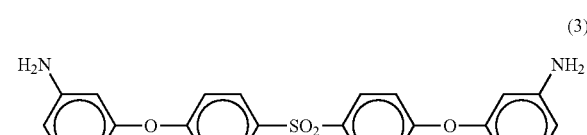

(7)

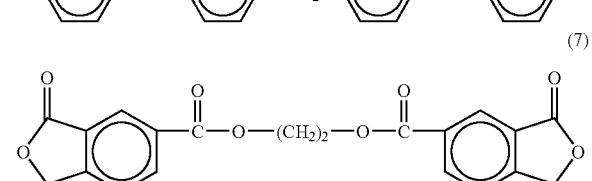

Comparative Example 1

A sample was made of the same monomers and through the same manner as that of Embodiment 1 except for the imidation of the polyamic acid solution, which is chemically carried out by using acetic anhydride and isoquinoline. The created sample was tested for its transparency, tearing strength, and toughness. Table 1 shows the results of the tests with respect to this sample.

Comparative Example 2

A sample was made of the same monomers and through the same manner as that of Embodiment 1 except for the imidation of the polyamic acid solution, which is carried out by heating the polyimide acid solution under a normal pressure circumstance. The created sample was tested for its transparency, tearing strength, and toughness. Table 1 shows the results of the tests with respect to this sample.

Comparative Example 3

Pyrromellitic dianhydride and 4,4'-diaminodiphenyl ether, which is substantially equimolar to the pyrromellilic (6)

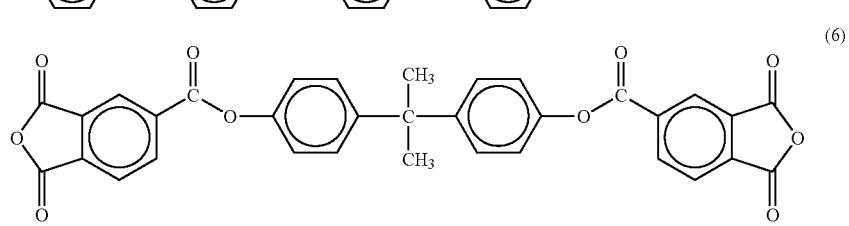

dianhydride, were polymerized in DMF to create polyamic acid polymer solution. Then, acetic anhydride and isoquinoline were added to the created polyamic acid polymer solution, and the polyamic acid polymer solution was applied on a glass plate by casting and heated for six minutes at 120° C. Next, the created half-cured film having self-supporting property was peeled off the glass plate and pinned by the four sides, and heated for a minute at 300° C., and another minute at 400° C., and still another minute at 500° C. to complete the imidation. With these processes, a polyimide film of 75 μm thick was created through chemical imidation. The created polyimide film was tested for its transparency, tearing strength, and toughness. Table 1 shows the results of the tests.

TABLE 1

| | TRANSPARENCY ($\lambda$ = 440 nm) | TEARING STRENGTH (N/mm) | TOUGHNESS |
|---|---|---|---|
| EMBODIMENT 1 | 78% | 5.2 | ACCEPTABLE |
| EMBODIMENT 2 | 73% | 3.1 | ACCEPTABLE |
| EMBODIMENT 3 | 72% | 4.6 | ACCEPTABLE |
| EMBODIMENT 4 | 76% | 4.2 | ACCEPTABLE |
| COMPARATIVE EXAMPLE 1 | 66% | 6.5 | ACCEPTABLE |
| COMPARATIVE EXAMPLE 2 | 73% | 1.5 | UNACCEPTABLE |
| COMPARATIVE EXAMPLE 3 | 1% | 4.7 | ACCEPTABLE |

As described, the present invention provides a polyimide film essentially transparent and colorless, and has sufficient toughness to prevent occurrences of a crack or a break when the film is folded and creased by hand.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICATION OF THE PRESENT INVENTION

The present invention may adopt an essentially transparent and colorless polyimide film used for liquid crystal display material, optical communication material, waveguide material and solar battery protection film or the like.

What is claimed is:

1. A polyimide film, which uses a soluble polyimide resin obtained by diamine constituent and acid dianhydride constituent, wherein the diamine constituent is a compound denoted by a following chemical formula (1), wherein the acid dianhydride constituent is denoted by a following chemical formula (2),

(1)

A. A SINGLE BOND OR A BIVALENT HYDROCARBON GROUP HAVING 1 TO 3 CARBON ATOMS

B:

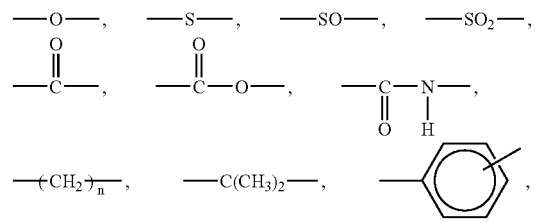

OR A SINGLE BOND
A SINGLE BOND OR A BIVALENT HYDROCARBON GROUP HAVING 1 TO 10 CARBON ATOMS

R:

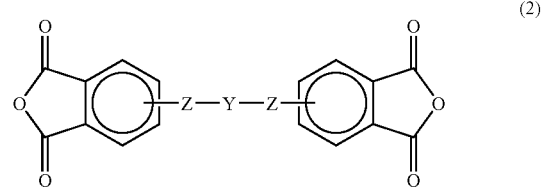

(2)

THE Zs ARE INDEPENDENT IN THE FORMULA.

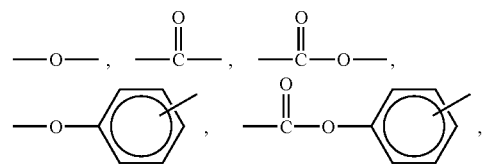

OR DENOTES A SINGLE BOND,
Y DENOTES,

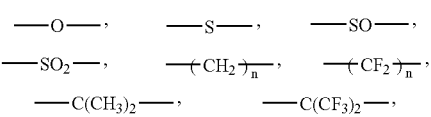

OR DENOTES A SINGLE BOND (n IS IN A RANGE FROM 1 TO 10)
wherein the polyimide film has a transparency of not less than 70% with respect to light with a wavelength of 440 nm and has a tearing strength of not less than 2N/mm when it is 75 μm thick.

2. The polyimide film of claim 1, manufactured by a method comprising the steps of:
1) mixing and polymerizing the diamine constituent and the acid dianhydride constituent in a solvent so as to obtain a polyamic acid solution, 2) heating the polyamic acid solution under a low-pressure circumstance of not more than $0.9 \times 10^5$ Pa for imidation so as to obtain a polyimide resin;
3) dissolving the polyimide resin thus obtained in a solvent;
4) casting and applying a polyimide solution obtained through the step 3) to a supporting body so as to coat the supporting body with the polyimide solution; and
5) drying and solidifying the polyimide solution.

* * * * *